United States Patent
Fachan

(10) Patent No.: US 7,346,720 B2
(45) Date of Patent: Mar. 18, 2008

(54) SYSTEMS AND METHODS FOR MANAGING CONCURRENT ACCESS REQUESTS TO A SHARED RESOURCE

(75) Inventor: Neal T. Fachan, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 173 days.

(21) Appl. No.: 11/255,346

(22) Filed: Oct. 21, 2005

(65) Prior Publication Data

US 2007/0094431 A1    Apr. 26, 2007

(51) Int. Cl.
G06F 13/14    (2006.01)
G06F 12/00    (2006.01)
G06F 13/16    (2006.01)

(52) U.S. Cl. .................. 710/200; 710/108; 711/150; 707/8

(58) Field of Classification Search ............ None
See application file for complete search history.

(56) References Cited

U.S. PATENT DOCUMENTS

| | | |
|---|---|---|
| 5,163,131 A | 11/1992 | Row et al. |
| 5,258,984 A | 11/1993 | Menon et al. |
| 5,403,639 A | 4/1995 | Belsan et al. |
| 5,548,724 A | 8/1996 | Akizawa et al. |
| 5,596,709 A | 1/1997 | Bond et al. |
| 5,657,439 A | 8/1997 | Jones et al. |
| 5,668,943 A | 9/1997 | Attanasio et al. |
| 5,734,826 A | 3/1998 | Olnowich et al. |
| 5,761,659 A * | 6/1998 | Bertoni ............ 707/8 |
| 5,774,643 A | 6/1998 | Lubbers et al. |
| 5,805,900 A * | 9/1998 | Fagen et al. ......... 710/220 |
| 5,862,312 A | 1/1999 | Mann |
| 5,870,563 A | 2/1999 | Roper et al. |
| 5,884,098 A | 3/1999 | Mason, Jr. |
| 5,933,834 A | 8/1999 | Aichelen |
| 5,943,690 A | 8/1999 | Dorricott et al. |
| 5,996,089 A | 11/1999 | Mann |
| 6,029,168 A | 2/2000 | Frey |
| 6,038,570 A | 3/2000 | Hitz et al. |

(Continued)

FOREIGN PATENT DOCUMENTS

EP    0774723    5/1997

(Continued)

OTHER PUBLICATIONS

Coulouris et al.; "Distributed Systems Concepts and Design"; Addison-Wesley; Second Edition; 1994; pp. 353-371 and 377-405.*

(Continued)

*Primary Examiner*—Mark H. Rinehart
*Assistant Examiner*—Ryan M Stiglic
(74) *Attorney, Agent, or Firm*—Knobbe Martens Olson & Bear, LLP

(57) ABSTRACT

The systems and methods manage concurrent access requests to a shared resource. The systems and methods utilize an access management algorithm that permits multiple processes to concurrently obtain shared locks on the shared resource, but also limits access to only one process when an exclusive lock is granted. In doing so, the systems and methods avoid the problems of starvation and deadlock.

17 Claims, 8 Drawing Sheets

U.S. PATENT DOCUMENTS

| | | | |
|---|---|---|---|
| 6,070,172 A | 5/2000 | Lowe | |
| 6,081,883 A | 6/2000 | Popelka et al. | |
| 6,138,126 A | 10/2000 | Hitz et al. | |
| 6,154,854 A | 11/2000 | Stallmo | |
| 6,209,059 B1 | 3/2001 | Ofer et al. | |
| 6,219,693 B1 | 4/2001 | Napolitano et al. | |
| 6,321,345 B1 | 11/2001 | Mann | |
| 6,334,168 B1 | 12/2001 | Islam et al. | |
| 6,384,626 B2 | 5/2002 | Tsai et al. | |
| 6,385,626 B1 | 5/2002 | Tamer et al. | |
| 6,397,311 B1 | 5/2002 | Capps | |
| 6,449,730 B2 | 9/2002 | Mann | |
| 6,457,139 B1 | 9/2002 | D'Errico et al. | |
| 6,502,172 B2 | 12/2002 | Chang | |
| 6,502,174 B1 | 12/2002 | Beardsley et al. | |
| 6,526,478 B1 | 2/2003 | Kirby | |
| 6,546,443 B1* | 4/2003 | Kakivaya et al. | 710/200 |
| 6,557,114 B2 | 4/2003 | Mann | |
| 6,567,926 B2 | 5/2003 | Mann | |
| 6,571,349 B1 | 5/2003 | Mann | |
| 6,574,745 B2 | 6/2003 | Mann | |
| 6,594,660 B1* | 7/2003 | Berkowitz et al. | 707/8 |
| 6,598,174 B1 | 7/2003 | Parks et al. | |
| 6,618,798 B1 | 9/2003 | Burton et al. | |
| 6,934,878 B2 | 8/2005 | Massa et al. | |
| 6,940,966 B2 | 9/2005 | Lee | |
| 7,146,524 B2 | 12/2006 | Patel et al. | |
| 2001/0047451 A1 | 11/2001 | Noble et al. | |
| 2002/0124137 A1 | 9/2002 | Ulrich et al. | |
| 2002/0138559 A1 | 9/2002 | Ulrich et al. | |
| 2002/0156840 A1 | 10/2002 | Ulrich et al. | |
| 2002/0156891 A1 | 10/2002 | Ulrich et al. | |
| 2002/0156973 A1 | 10/2002 | Ulrich et al. | |
| 2002/0156974 A1 | 10/2002 | Ulrich et al. | |
| 2002/0156975 A1 | 10/2002 | Ulrich et al. | |
| 2002/0161846 A1 | 10/2002 | Ulrich et al. | |
| 2002/0161850 A1 | 10/2002 | Ulrich et al. | |
| 2002/0161973 A1 | 10/2002 | Ulrich et al. | |
| 2002/0165942 A1 | 11/2002 | Ulrich et al. | |
| 2002/0166026 A1 | 11/2002 | Ulrich et al. | |
| 2002/0166079 A1 | 11/2002 | Ulrich et al. | |
| 2002/0169827 A1 | 11/2002 | Ulrich et al. | |
| 2002/0174295 A1 | 11/2002 | Ulrich et al. | |
| 2002/0174296 A1 | 11/2002 | Ulrich et al. | |
| 2002/0178162 A1 | 11/2002 | Ulrich et al. | |
| 2002/0191311 A1 | 12/2002 | Ulrich et al. | |
| 2002/0194523 A1 | 12/2002 | Ulrich et al. | |
| 2002/0194526 A1 | 12/2002 | Ulrich et al. | |
| 2003/0014391 A1 | 1/2003 | Evans et al. | |
| 2003/0033308 A1 | 2/2003 | Patel et al. | |
| 2003/0135514 A1 | 7/2003 | Patel et al. | |
| 2003/0172149 A1 | 9/2003 | Edsall et al. | |
| 2004/0153479 A1 | 8/2004 | Mikesell et al. | |
| 2004/0199734 A1* | 10/2004 | Rajamani et al. | 711/163 |
| 2005/0114609 A1* | 5/2005 | Shorb | 711/152 |
| 2006/0004760 A1* | 1/2006 | Clift et al. | 707/9 |
| 2006/0095438 A1 | 5/2006 | Fachan et al. | |
| 2006/0101062 A1 | 5/2006 | Godman et al. | |
| 2006/0230411 A1* | 10/2006 | Richter et al. | 719/328 |
| 2006/0277432 A1 | 12/2006 | Patel | |
| 2007/0091790 A1 | 4/2007 | Passey et al. | |
| 2007/0094269 A1 | 4/2007 | Mikesell et al. | |
| 2007/0094277 A1 | 4/2007 | Fachan et al. | |
| 2007/0094310 A1 | 4/2007 | Passey et al. | |
| 2007/0094431 A1 | 4/2007 | Fachan | |
| 2007/0094452 A1 | 4/2007 | Fachan | |
| 2007/0168351 A1 | 7/2007 | Fachan | |
| 2007/0171919 A1 | 7/2007 | Godman et al. | |
| 2007/0195810 A1 | 8/2007 | Fachan | |

FOREIGN PATENT DOCUMENTS

| | | |
|---|---|---|
| WO | WO 01/14991 | 3/2001 |
| WO | WO 02/061737 | 8/2002 |

OTHER PUBLICATIONS

Stallings, William; "Operating Systems"; Prentice Hall; Fourth Edition; 2001; pp. 197-253 and 265-293.*

Nov. 15, 2002 International Search Report PCT/US02/24728.

Apr. 20, 2004 International Search Report PCT/US03/36699.

Aug. 6, 2004 International Search Report PCT/US03/33704.

Philip A. Bernstein, Vassos Hadzilacos, and Nathan Goodman, *Concurrency Control and Recovery in Database Systems*, Addison-Wesley, 1987.

Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.

Kenneth P. Birman, *Building Secure and Reliable Network Applications*, Manning, 1996, pp. 1-327.

Kenneth P. Birman, *Building Secure and Reliable Network Applications*, Manning, 1996, pp. 328-620.

Coulouris et al., *Distributed Systems Concepts and Design*, Addison-Wesley, Second Edition, 1994, pp. 353-371 and 377-405.

Jim Gray and Andreas Reuter, *Transaction Processing: Concepts and Techniques*, Morgan Kaufmann, 1993, pp. 1-328.

Jim Gray and Andreas Reuter, *Transaction Processing: Concepts and Techniques*, Morgan Kaufmann, 1993, pp. 329-664.

Jim Gray and Andreas Reuter, *Transaction Processing: Concepts and Techniques*, Morgan Kaufmann, 1993, pp. 665-1105.

Nancy A. Lynch, *Distributed Algorithms*, Morgan Kaufmann, 1996, pp. 1-409.

Nancy A. Lynch, *Distributed Algorithms*, Morgan Kaufmann, 1996, pp. 410-871.

Sape Mullender, editor, *Distributed Systems ($2^{nd}$ Ed.)*, ACM Press/Addison-Wesley Publishing Co., New York, NY, USA, 1993, pp. 1-327.

Sape Mullender, editor, *Distributed Systems ($2^{nd}$ Ed.)*, ACM Press/Addison-Wesley Publishing Co., New York, NY, USA, 1993, pp. 328-604.

Gibson, Garth A. et al., *The Scotch Parallel Storage System*, IEEE, 1995, pp. 403-410.

Gerhard Weikum, et al., *Transactional Information Systems: Theory, Algorithms, and the Practice of Concurrency Control and Recovery*, Morgan Kaufmann, 2002, pp. 1-450.

Gerhard Weikum, et al., *Transactional Information Systems: Theory, Algorithms, and the Practice of Concurrency Control and Recovery*, Morgan Kaufmann, 2002, pp. 451-863.

Sanjay Ghemawat et al., *The Google File System, Symposium on Operating Systems Principles*, Oct. 19-22, 2003, 15 pages, Bolton Landing, NY.

Pei Cao et al., *The TickerTAIP parallel RAID architecture*, 1993, 12 pages, Princeton, NJ.

Pei Cao et al., *The TickerTAIP parallel RAID architecture*, ACM Transactions on Computer Systems, vol. 12, No. 3, Aug. 1994, 34 pages, Palto Alto, California.

Bob Duzett, et al., *An Overview of the nCube 3 Supercomputer*, IEEE, Jul. 1992, pp. 458-464.

John Henry Hartman, *The Zebra Striped Network File System*, 1994, pp. 1-148, University of California at Berkeley.

Darrell D.E. Long et al., *Swift/RAID: A Distributed RAID System*, Computing Systems, vol. 7, No. 3 Summer 1994, pp. 333-359.

Michael Stonebraker et al., *Distributed Raid: A new Multiple copy Algorithm*, IEEE 1990, pp. 430-437, Berkeley, California.

United States Court of Appeals, Federal Circuit, *Seachange International, Inc. Vs. nCUBE, Corp.*, Oct. 26, 2004, 28 pages.

United States Court of Appeals, Federal Circuit, *Seachange International, Inc. Vs. C-Cor, Inc.*, Jun. 29, 2005, 22 pages.

United States District Court, Delaware, *Seachange International, Inc. Vs. nCUBE, Corp.*, Apr. 7, 2004, 13 pages.

United States District Court, Delaware, *Seachange International, Inc.* Vs. *nCUBE, Corp.*, Aug. 29, 2000, 12 pages.
European Search Report dated May 21, 2007 issued to EP application No. 02756944.1-2201.
Stallings, William, "Operating Systems," Prentice Hall, Fourth Edition, 2001, pp. 197-253 and 265-293.
Steven M. Bauer, Letter to Steve Goldman, Jul. 31, 2006 (including the first pages of the patents).
Arthur S. Rose, Letter to Steven M. Bauer, Aug. 7, 2006.
Steven M. Bauer, Letter to Arthur S. Rose, Sep. 25, 2006.
Steven M. Bauer, Letter to Arthur S. Rose, Oct. 31, 2006.
Arthur S. Rose, Letter to Steven M. Bauer, Nov. 9, 2006.
Steven M. Bauer, Letter to Arthur S. Rose, Feb. 6, 2007.
Arthur S. Rose, Letter to Steven M. Bauer, Feb. 23, 2007.
Steven M. Bauer, Letter to Arthur S. Rose, Jun. 7, 2007 (including claim chart).
Arthur S. Rose, Letter to Steven M. Bauer, Jun. 22, 2007.
Todd A. Gerety, Letter to Arthur S. Rose, Jun. 26, 2007 (including exhibits listed separately).
Isilon Systems, "Isilon IQ Platform Overview", 1-4.
Isilon Systems, "Uncompromising Reliability through Clustered Storage", Sep. 2006, 1-10.
Byteandswitch, "Discovery Chooses Isilon," Apr. 23, 2007, 1.
Taneja Group Technology Analysts, "The Power of InfiniBand and Clustered Storage", Dec. 2005, 1-8.
Arthur S. Rose, Letter to Steven M. Bauer, Aug. 31, 2007.

* cited by examiner

| INDEX NUMBER | PER-PROCESS COUNT |
|---|---|
| 0 | |
| 1 | |
| 2 | |
| ⋮ | ⋮ |
| n−1 | |
| n | |

*FIG. 5A* at: t=6

| INDEX NUMBER | PER-PROCESS COUNT |
|---|---|
| 0 | 0 |
| 1 | 1 |
| 2 | 0 |
| ⋮ | ⋮ |
| n−1 | 0 |
| n | 0 |

*FIG. 5B*

SYSTEMS AND METHODS FOR MANAGING CONCURRENT ACCESS REQUESTS TO A SHARED RESOURCE

REFERENCE TO RELATED APPLICATIONS

The present disclosure relates to U.S. patent application Ser. No. 11/255,817, titled "SYSTEMS AND METHODS FOR DISTRIBUTED SYSTEM SCANNING," U.S. patent application Ser. No. 11/256,410, titled "SYSTEMS AND METHODS FOR PROVIDING VARIABLE PROTECTION," U.S. patent application Ser. No. 11/255,818, titled "SYSTEMS AND METHODS FOR MAINTAINING DISTRIBUTED DATA," U.S. patent application Ser. No. 11/256,317, titled "SYSTEMS AND METHODS FOR USING EXCITEMENT VALUES TO PREDICT FUTURE ACCESS TO RESOURCES," and U.S. Patent Application No. titled "SYSTEMS AND METHODS FOR ACCESSING AND UPDATING DISTRIBUTED DATA," each filed on Oct. 21, 2005 and each hereby incorporated by reference herein in their entirety.

FIELD OF THE INVENTION

The systems and methods of the present invention relate generally to the field of concurrent computer processing, and in particular to managing concurrent access requests to a shared resource.

BACKGROUND

The proliferation of networked computers and increased processor speeds in the workplace, at home and over the internet have increased the need by users on a computer network to concurrently access shared resources. Commonly, two processes will need to access a shared resource at the same time. This problem can arise, for example, when some users wish to read from a shared resource on a data storage device while another user is requesting permission to write to that shared resource. In another example, the problem can arise with respect to a shared resource on a standalone machine or on shared resources accessed across several networks. Though shared resources presently permit many users to obtain shared locks concurrently, several limitations to resource access can arise when one or more users wish to concurrently obtain an exclusive lock.

One such limitation is that shared lock requests and exclusive lock requests must be mutually exclusive. For example, if one process obtains a shared lock to read data and another process concurrently obtains an exclusive lock to write data to the same data segment, it is possible that the first process will read erroneous or outdated data. A practical illustration of this problem occurs when two remote members of a jointly held bank account wish to concurrently check the balance of their account and subsequently withdraw the reported balance via an automated teller machine. Without a data storage system that provides for mutual exclusivity, the joint account holders may overdraw the account if both members decide to withdraw the balance.

Shared resources that employ mutually exclusive shared and exclusive locks encounter the problems of starvation and deadlock, both of which are well known to those skilled in the art. Starvation occurs when a process that requests an exclusive lock on a shared resource is denied access to that shared resource in order to fulfill the requirement of mutual exclusivity (e.g., another process already owns a shared lock). Normally, starvation ends when existing shared locks on the shared resource complete their operations and release their locks. However, when other processes subsequently obtain multiple shared locks on the shared resource, the process requesting an exclusive lock will be starved from the shared resource for as long as any shared lock owners exist. Starvation is undesirable because it can delay critical system updates and is inefficient.

Deadlock occurs when, due to mutual exclusion, a set of processes are waiting on another process in the set to execute. For example, if the set is comprised of processes $P_0$ through $P_n$ wherein $P_0$ is waiting on $P_1$, $P_1$ is waiting on $P_2$, $P_2$ is waiting on $P_3$, . . .and $P_n$ is waiting on $P_0$, a deadlock has occurred because no process in the set can execute until the process it is waiting for executes. For example, this problem occurs when a process with a shared lock requests a recursive lock after another process has already requested an exclusive lock. In this situation, the original shared lock is waiting on the recursive lock, the recursive lock is waiting on the exclusive lock, and the exclusive lock is waiting on the original shared lock. Deadlock is undesirable because it requires one process in the set to be manually aborted and is inefficient.

Thus, a need exists for computer networks to accommodate shared and exclusive lock requests while satisfying the requirement of mutual exclusivity and avoiding the problems of starvation and deadlock.

One response has been to account for the number of processes that hold shared locks on a particular shared resource. This solution defers exclusive lock requests so long as a process holds a shared lock on the resource. This solution is inadequate because it does not account for processes with recursive locks on the resource. In failing to differentiate between first-time and recursive lock requests, a process waiting for an exclusive lock can be starved if first-time lock requests are perpetually granted and a process waiting for a recursive lock can cause deadlock if its recursive lock request is deferred.

Another response has been to individually account for the number of shared locks held by each process for each particular shared resource. While shared locks exist, processes waiting to obtain an exclusive lock are queued and permitted to write only when all preceding processes have terminated their shared locks; all subsequent shared lock requests are put to sleep and granted only after preceding exclusive locks terminate. This solution is inadequate because it is computationally expensive and results in excessive overhead when the number of potential concurrent processes and the number of shared resources are considered.

SUMMARY

The systems and methods for managing concurrent access requests to a shared resource disclosed herein advantageously enable multiple processes to concurrently request exclusive and shared locks on the same shared resource. The disclosed access management system preserves mutual exclusivity for those processes that request exclusive locks on the shared resource while avoiding the problems of starvation and deadlock. Effectively, the access management system provides a compromise between processes waiting to obtain an exclusive lock and processes that require recursive locks to complete the execution of their operations. As a result, processes waiting to obtain an exclusive lock are not starved, and shared lock owners are granted recursive locks in order to avoid deadlock.

In one embodiment, the access management system advantageously uses three data structures: a global count, a per-process count, and an exclusive_waiting count. Using these structures, the system utilizes a dynamic method of accounting for the number of shared locks on the shared resource and the number of processes waiting for an exclusive lock on the shared resource. When no processes are waiting to obtain an exclusive lock, the access management system accounts for the number of shared locks on the shared resource in the global count, whether the shared locks are first-time or recursive locks, and all shared lock requests are granted. Upon an exclusive lock request, the exclusive_waiting count is adjusted accordingly and subsequent shared locks are accounted for in the per-process count, a process-specific data structure. In the event that the per-process count indicates that there are no shared locks, termination of subsequent shared locks is accounted for in the global count. After the global count indicates that no shared locks are present, the accounting transfers to the per-process count. At this point, the recursive locks are granted and any first-time locks are deferred. When the per-process count indicates that no shared locks exist, the shared locks have terminated, an exclusive lock is granted, and the exclusive_waiting count is adjusted accordingly.

In another embodiment, a method provides for managing concurrent access requests to a data segment. The method includes tracking shared lock requests from a plurality of processes in a first data structure when no exclusive waiter is present, wherein the first data structure tracks the total number of shared locks; tracking shared lock requests in a second data structure when an exclusive waiter is present and the total number of shared locks is greater than zero, wherein the second data structure tracks the number of shared locks held by each of the plurality of processes; tracking recursive shared lock requests in the second data structure when an exclusive waiter is present and the total number of shared locks is zero; and granting an exclusive lock to the exclusive waiter when the total number of shared locks is zero and the number of shared locks held by each of the plurality of processes is zero.

In another embodiment, a method provides for managing concurrent access requests to a shared resource. The method includes receiving a first plurality of shared requests; granting the first plurality of shared requests; tracking completion of the first plurality of shared requests; receiving an exclusive request; receiving a second plurality of shared requests before the first plurality of shared requests has been completed; granting the second plurality of shared requests; tracking completion of the second plurality of shared requests on a per-process basis; receiving a third plurality of shared requests after the first plurality of shared requests has been completed; determining whether each of the third plurality of shared requests is a recursive request; for each recursive request, granting the recursive request and tracking completion of the recursive request on a per-process basis; and after completion of the third plurality of shared requests and the recursive requests, granting the exclusive request In yet another embodiment, a method provides for managing concurrent access requests to a shared resource, wherein a first at least one process has a shared lock on the shared resource. The method includes storing a representation of the number of a second at least one processes waiting to obtain an exclusive lock on the shared resource in an exclusive waiting count, wherein the exclusive waiting count is a first data structure and the second at least one processes waiting to obtain an exclusive lock on the shared resource are put to sleep; storing a representation of the number of first at least one processes that have a shared lock on the shared resource in a global count if the exclusive waiting count indicates that none of the, second at least one processes are waiting to obtain an exclusive lock on the shared resource, wherein the global count is a second data structure; adjusting a per-process count when one of the first at least one processes obtains a shared lock on the shared resource if the exclusive waiting count indicates that at least one of the second at least one processes is waiting to obtain an exclusive lock on the shared resource, wherein the per-process count is a third data structure that stores a representation of the number of shared locks held by each of the first at least one processes; adjusting the per-process count when one of the first at least one processes terminates a shared lock on the shared resource if the exclusive waiting count indicates that at least one of the second at least one processes is waiting to obtain an exclusive lock on the shared resource and the global count indicates that at least one of the first at least one processes holds a shared lock on the shared resource and the per-process count indicates that the one of the first at least one processes does not hold a shared lock on the shared resource; adjusting the global count when at least one of the first at least one processes terminates a shared lock on the shared resource if the exclusive waiting count indicates that at least one of the second at least one processes is waiting to obtain an exclusive lock on the shared resource and the global count indicates that at least one of the first at least one processes holds a shared lock on the shared resource and the per-process count indicates that none of the first at least one processes holds a shared lock on the shared resource; and granting all shared lock requests from the first at least one processes if the global count indicates that at least one of the first at least one processes holds a shared lock on the shared resource.

In a further embodiment, an access management system manages concurrent access requests to a shared resource. The system comprises a shared resource and a processor module, wherein a first at least one process has a shared lock on the shared resource. The processor module is configured to receive requests from the first at least one processes for a shared lock on the shared resource; receive requests from a second at least one process for an exclusive lock on the shared resource; store a representation of the number of a second at least one processes waiting to obtain an exclusive lock on the shared resource in an exclusive waiting count, wherein the exclusive waiting count is a first data structure and the second at least one processes waiting to obtain an exclusive lock on the shared resource are put to sleep; store a representation of the number of the first at least one processes that have a shared lock on the shared resource in a global count if the exclusive waiting count indicates that none of the second at least one processes are waiting to obtain an exclusive lock on the share resource, wherein the global count is a second data structure; adjust a per-process count when one of the first at least one processes obtains a shared lock on the shared resource if the exclusive waiting count indicates that at least one of the second at least on processes is waiting to obtain an exclusive lock on the shared resource, wherein the per-process count is a third data structure that stores a representation of the number of shared locks held by each of the first at least one processes; adjust the per-process count when one of the first at least one processes terminates a shared lock on the shared resource if the exclusive waiting count indicates that at least one of the second at least one processes is waiting to obtain an exclusive lock on the shared resource and the global count indicates that at least one of the first at least one processes holds a shared lock on the shared resource and the per-process count indicates that one of the first at least one processes holds a shared lock on the shared resource; adjust the global count when one of the first at least one processes terminates a shared lock on the shared resource if the exclusive waiting count indicates that at least one of the second at least one processes is waiting to obtain an exclusive lock on the shared resource and the global count indicates that at least one of the first at least processes holds a shared lock on the shared resource and the per-process count indicates that the one of the first at least one processes does not hold a shared lock on the shared resource; and grant all shared lock requests from the first at least one processes if the global count indicates that at least one of the first at least one processes holds a shared lock on the shared resource.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 5a illustrates a sample hash table.

FIG. 5b illustrates a sample hash table with corresponding sample data.

DETAILED DESCRIPTION OF PREFERRED EMBODIMENTS

Figure 1A:
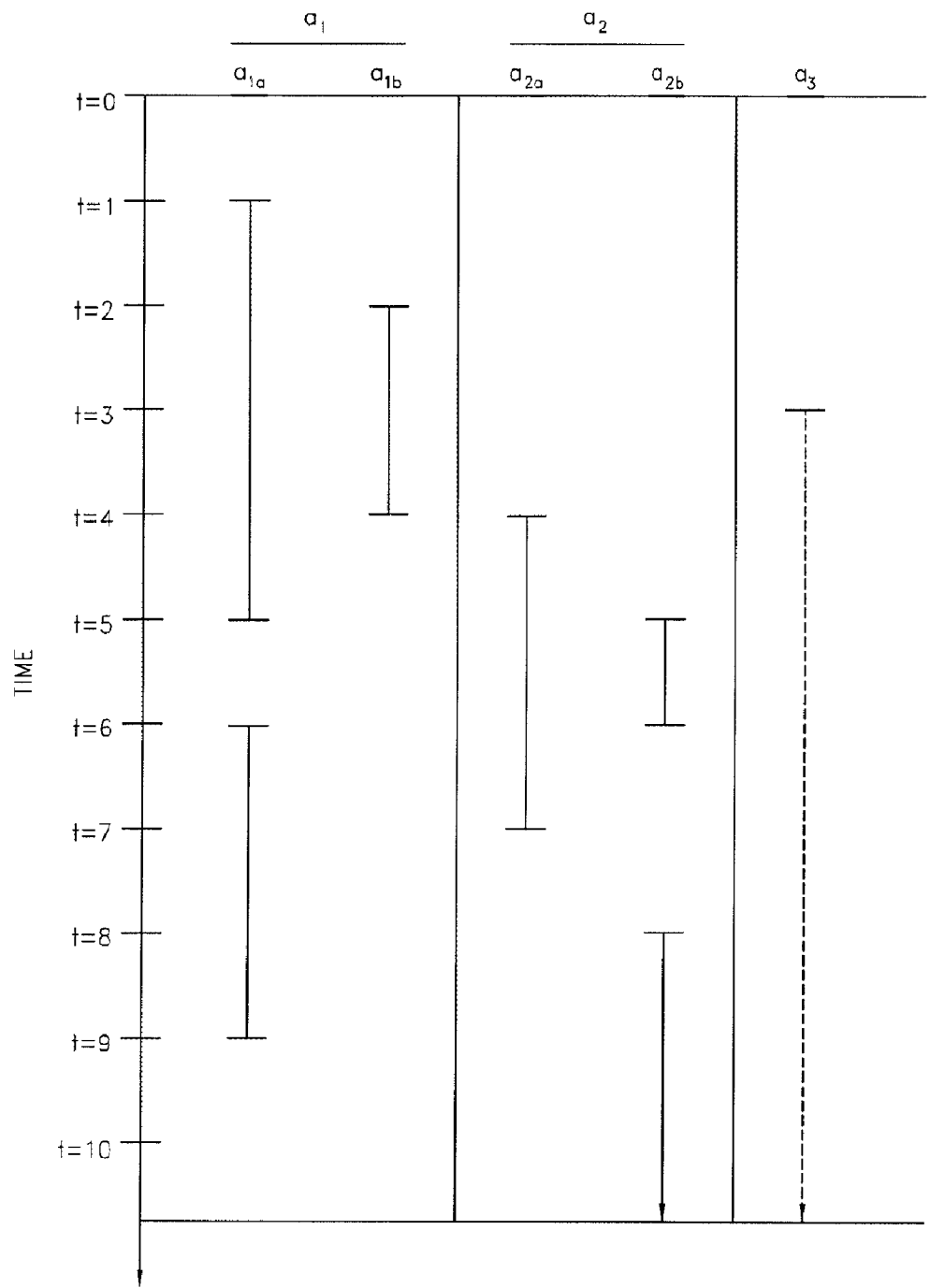
FIG. 1a illustrates the problem of starvation as it exists in the prior art.

Systems and methods which represent various embodiments and an example application of the invention will now be described with reference to the drawings. Variations to the systems and methods which represent other embodiments will also be described.

For purposes of illustration, some embodiments will be described in the context of a standalone computer. The inventors contemplate that the present invention is not limited by the type of environment in which the systems and methods are used, and that the systems and methods may be used in other environments, such as, for example, the Internet, the World Wide Web, a private network for a hospital, a broadcast network for a government agency, an internal network of a corporate enterprise, an intranet, a wide area network, and so forth. The figures and descriptions, however, relate to an embodiment of the invention wherein the environment is that of concurrent access requests to a shared resource. It is recognized that in other embodiments, the systems and methods may be implemented to control concurrent access requests to software applications, software processes, hardware devices, and the like. Moreover, the specific implementations described herein are set forth in order to illustrate, and not to limit, the invention. The scope of the invention is defined by the appended claims.

These and other features will now be described with reference to the drawings summarized above. The drawings in the associated descriptions are provided to illustrate embodiments of the invention and not to limit the scope of the invention. Throughout the drawings, reference numbers may be re-used to indicate correspondence between referenced elements.

I. Overview

The systems and methods of the present invention provide a system for managing concurrent access requests to a shared resource. In one embodiment, the system controls concurrent shared lock requests and exclusive lock requests for a shared resource. By definition, shared lock requests can be granted concurrently and exclusive lock requests can only be granted to one lock owner at a time.

The differences between the nature of exclusive and shared lock requests give rise to the system limitation of mutual exclusivity. Mutual exclusivity requires that a shared resource has only one exclusive lock owner at any given time. Therefore, should a process have a shared lock on the shared resource, all concurrent exclusive lock requests are deferred and put to sleep and only shared lock requests can be granted. On the other hand, if a shared resource has an exclusive lock owner, all concurrent lock requests, whether they are shared or exclusive, are deferred and put to sleep.

For example, mutual exclusivity can be illustrated in the context of READ and WRITE operations on a data segment. In this example, all READ operations require a shared lock on the data segment while all WRITE operations require an exclusive lock on the data segment. That is, mutual exclusivity permits multiple users to READ the data segment concurrently, and alternatively requires that only one user may WRITE to the data segment at any given time. Mutual exclusivity is necessary in this context because it is desirable to exclude READ operations on a data segment while a WRITE operation is modifying that data segment. If, however, READ and WRITE operations were permitted to execute concurrently, the READ processes may receive outdated data that is being concurrently modified by a WRITE operation. Furthermore, mutual exclusivity is preferable for data read before a WRITE operation because the age of data read from the data segment can be reconciled with the date of the last WRITE operation on that data segment.

The system for managing concurrent access requests to a shared resource advantageously provides access, both shared and exclusive, to data when there are a large number of shared lock requests especially in proportion to the number of exclusive lock requests. In some embodiments, the system achieves a compromise between the shared lock and exclusive lock requests such that all requests are granted in an optimally efficient manner.

One benefit of some embodiments is that they avoid the problem of starvation caused by systems that implement mutual exclusivity. Starvation occurs when one process indicates an intention to obtain an exclusive lock on a shared resource but can never do so because it is possible for other processes to perpetually obtain shared locks before the exclusive lock is granted. For example, assume that process a, has obtained a shared lock on a shared resource. To satisfy the principle of mutual exclusion, process $a_3$, a process that wishes to obtain an exclusive lock, must wait until all processes have terminated their shared lock. Normally, $a_3$ would be able to obtain an exclusive lock when a, has terminated its shared lock. If, however, another process, $a_2$, obtains a shared lock concurrent with a, $a_3$ must now wait on both $a_1$, and $a_2$ to terminate their shared locks. Should other processes obtain shared locks on the shared resource without interruption, $a_3$ will undergo starvation because it will perpetually wait on all shared locks to terminate.

The following sample code illustrates how a system, wishing to implement mutual exclusivity, will encounter the problem of starvation:

```
shared_lock(x)
{
    lock(x.mutex)
    while (x.exclusive > 0)
        sleep (x)
    x.shared = x.shared + 1
    unlock(x.mutex)
}
shared_unlock(x)
{
    lock(x.mutex)
    x.shared = x.shared - 1
    if (x.shared == 0)
        wakeup (x)
    unlock(x.mutex)
}
exclusive_lock(x)
{
    lock(x.mutex)
    while (x.exclusive > 0 or x.shared > 0)
        sleep(x)
    x.exclusive = 1
    unlock(x.mutex)
}
exclusive_unlock(x)
{
    lock(x.mutex)
    x.exclusive = 0
    wakeup(x)
    unlock(x.mutex)
}
```

Given this code, assume that the following operations are performed in sequence: Operation 1 in which process a, calls shared_lock (x), a first-time shared lock; Operation 2 in which process $a_3$ calls exclusive_lock (x), an exclusive lock request; and Operation 3 in which process $a_2$ calls shared_lock (x), a recursive shared lock request, before $a_1$ calls shared_unlock (x).

Upon execution of Operation 1, process $a_1$ is granted a first-time lock and x. shared is incremented to equal 1 (assuming an initialization of 0). Operation 2 calls exclusive_lock(x) which puts the exclusive lock request to sleep for as long as x. shared is greater than zero. Now, if Operation 3 calls shared_lock (x) before $a_1$ calls shared_unlock (x), x. shared will equal 2 and Operation 2 will have to wait on both $a_1$ and $a_2$ to decrement x. shared to zero by calling shared_unlock (x). Thus, $a_3$ undergoes starvation even though $a_2$ requested a shared lock after $a_3$ requested its exclusive lock.

Circumstances that would exacerbate this problem are apparent. Should other processes perpetually call shared_lock (x) before process $a_3$ is able to obtain an exclusive lock (e.g., before x. shared is equal to zero), $a_3$ would never be able to access the shared resource.

FIG. 1A further illustrates the problem of starvation as it exists in the prior art. The vertical axis represents time, and the horizontal access depicts three processes: $a_1$, $a_2$, and $a_3$. For purposes of this illustration, $a_1$ and $a_2$ request only shared locks and $a_3$ requests only exclusive locks.

At t=0, no locks exist on the shared resource. At t=1, process $a_1$ requests and obtains a first-time shared lock via subprocess $a_{1a}$. A process that has no other shared locks will be referred to herein as a first-time shared lock. Thus, at t=1, $a_1$ has a first-time shared lock on the shared resource and x. shared equals one.

At t=2, process $a_1$ requests and receives a second shared lock via subprocess $a_{1b}$ and x. shared equals 2. A process that receives a second, concurrent shared lock will be referred to herein as a recursive lock. Thus, at t=2, $a_1$ has a recursive lock on the shared resource.

At t=3, $a_3$ requests an exclusive lock. Because a shared lock exists on the shared resource, $a_3$ must wait until all shared locks have terminated before it can obtain its exclusive lock. At t=4, $a_1$ terminates its recursive lock via $a_{1b}$ such that x. shared equals 1, and $a_1$ continues to hold its initial shared lock. Also, $a_2$ requests and obtains a first-time lock via $a_{2a}$ on the shared resource such that x. shared equals 2. At this point, $a_1$ and $a_2$ have a shared lock on the resource. At t=5, $a_2$ requests a recursive lock via $a_{2b}$ and $a_1$ terminates its shared lock via $a_{1a}$ and x. shared equals 2. At t=6, $a_1$ requests a first-time shared lock via $a_{1a}$ and $a_2$ terminates it recursive lock via $a_{2b}$ such that x. shared equals 2.

During the preceding operations, from t=3 to t=6, process $a_3$ has had its exclusive lock request deferred. As illustrated in FIG. 1A, the problem of starvation becomes evident should $a_1$ and $a_2$ continue to perpetually request and obtain shared locks on the resource. Because the method employed to generate FIG. 1A does not allow for the termination of shared locks and does not put first-time locks to sleep when an exclusive waiter is present, $a_3$ will be starved for so long as any other process in the system possesses a shared lock on the shared resource. It is desirable to avoid the problem of starvation because it can unnecessarily impede essential operations on a shared resource such as a critical system update.

Another benefit of some embodiments is that they avoid the problem of deadlock caused by systems that implement mutual exclusivity. Deadlock occurs when a set of processes are waiting on another process in the set to execute. For example, if the set is comprised of processes $P_0$ through $P_n$ wherein $P_0$ is waiting on $P_1$, $P_1$ is waiting on $P_2$, $P_2$ is waiting on $P_3$, ... and $P_n$ is waiting on $P_0$, a deadlock has occurred because no process in the set can execute until the process it is waiting for executes.

Figure 1B:
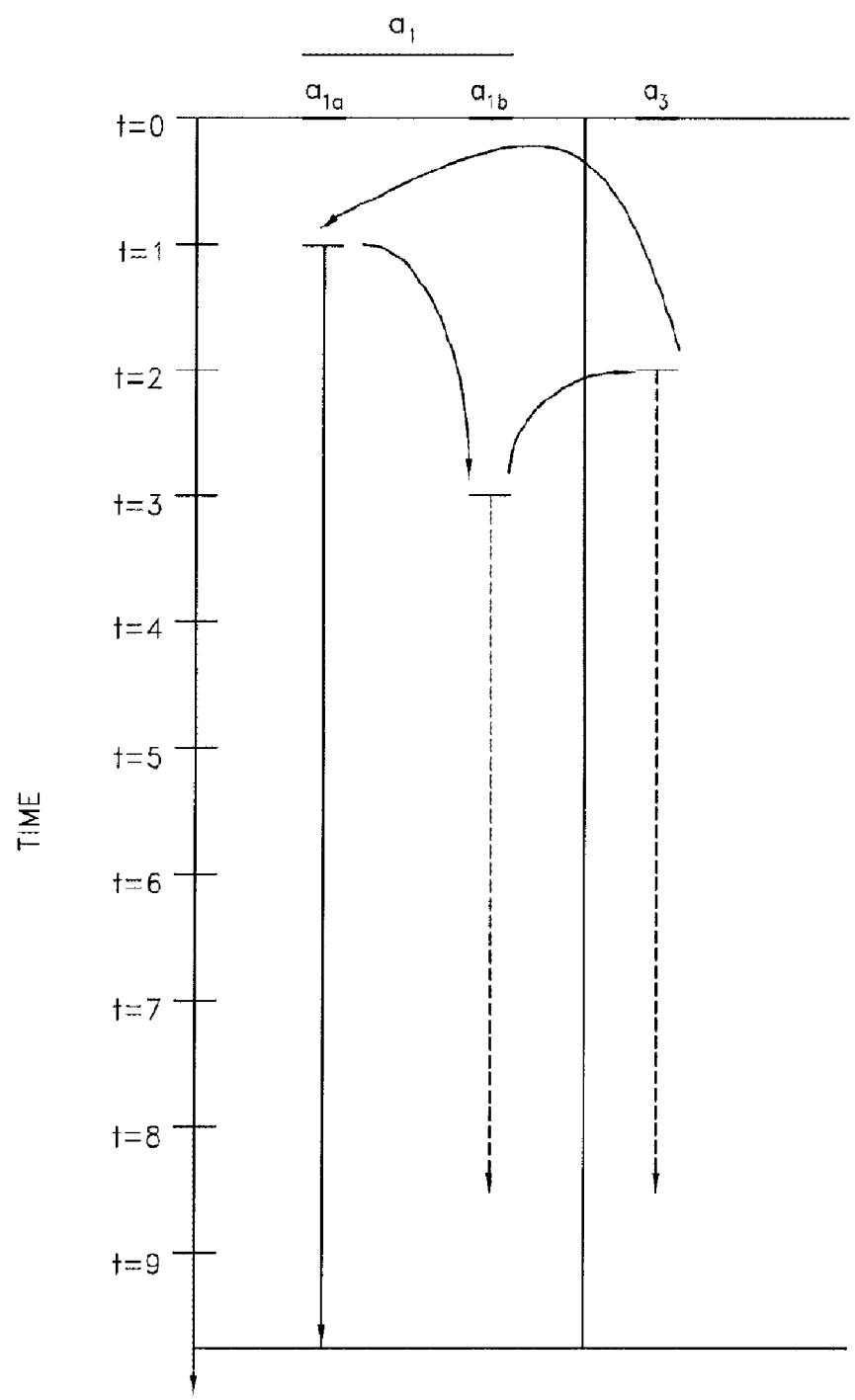
FIG. 1b illustrates the problem of deadlock as it exists in the prior art.

The following sample code along with FIG. 1B illustrates how a system, wishing to implement mutual exclusivity, will encounter the problem of deadlock:

```
shared_lock(x)
{
    lock(x.mutex)
    while (x.exclusive > 0 or x.exclusive_waiting > 0)
        sleep (x)
    x.shared = x.shared + 1
    unlock(x.mutex)
}
shared_unlock(x)
{
    lock(x.mutex)
    x.shared = x.shared - 1
```

-continued

```
    if (x.shared == 0)
        wakeup (x)
    unlock(x.mutex)
}
exclusive_lock(x)
{
    lock(x.mutex)
    x.exclusive_waiting = x.exclusive_waiting + 1
    while (x.exclusive > 0 or x.shared > 0)
        sleep(x)
    x.exclusive_waiting = x.exclusive_waiting - 1
    x.exclusive = 1
    unlock(x.mutex)
}
exclusive_unlock(x)
{
    lock(x.mutex)
    x.exclusive = 0
    wakeup(x)
    unlock(x.mutex)
}
```

Given this code and the timeline depicted in FIG. 1B, assume that the following operations are performed in sequence: Operation 1 in which $a_1$ calls shared_lock (x), a first-time shared lock, at t=1; Operation 2 in which $a_3$ calls exclusive_lock (x), an exclusive lock request, at t=2; and Operation 3 in which $a_1$ calls shared_lock (x), a recursive lock request, at t=3

Upon execution of Operation 1, process $a_1$ is granted a first-time shared lock via subprocess $a_{1a}$, and x. shared equals 1 (assuming an initialization of 0). Operation 2 calls exclusive_lock(x) which first increments x. exclusive_waiting and then puts the exclusive lock request to sleep for as long as x. shared is greater than zero. In other words, Operation 2 is waiting for Operation 1 to complete execution before it can grant $a_3$ an exclusive lock and decrement x. exclusive_waiting to zero.

Now assume that $a_1$ must obtain a recursive lock via $a_{1b}$ (e.g., Operation 3) in order to complete Operation 1. Operation 3 calls shared_lock (x) which puts $a_{1b}$ to sleep for as long as x. exclusive_waiting is non-zero. In other words, Operation 3 is waiting on Operation 2 to complete execution before it can obtain the recursive lock.

Therefore, Operation 1 is waiting on Operation 3 (e.g., shared lock waiting on recursive lock); Operation 2 is waiting on Operation 1 (e.g., exclusive lock waiting on shared lock); and Operation 3 is waiting on Operation 2 (e.g., recursive lock waiting on exclusive lock).

It is desirable to avoid deadlock because it can cause all operations on a data segment to "hang." Deadlock decreases system efficiency and requires a system administrator to manually abort one process in the set in order for the other processes in the set to execute.

II. Method for Managing Concurrent Access Requests to a Shared Resource.

Figure 2:
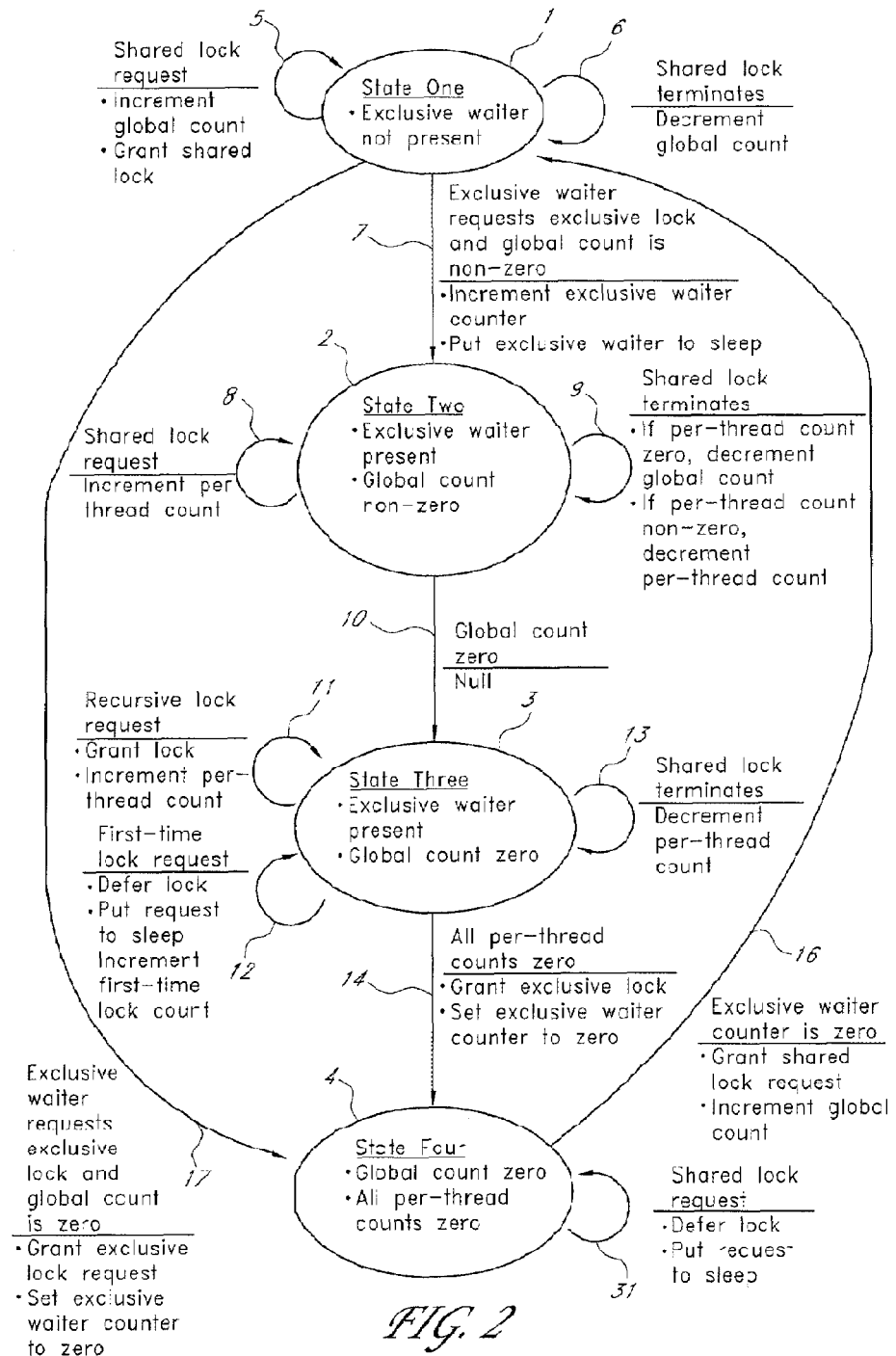
FIG. 2 illustrates one embodiment of the state diagram for managing concurrent access requests to a shared resource.

FIG. 2 illustrates one embodiment of a state diagram for managing concurrent access requests to a shared resource when one exclusive waiter is present. In this embodiment, the method transitions the accounting of shared locks on a particular resource between four states: state one 1; state two 2; state three 3; and state four 4. As the method moves from state one 1 to state four 4, the method is initially done in a global count. Upon the presence of an exclusive waiter, the accounting progressively transitions to a process-specific basis.

In state one 1, no exclusive waiter is present. So long as no exclusive waiter is present, the method remains in state one 1. Upon receiving a shared lock request 5, the method increments the global count to reflect the total number of shared locks on the shared resource but remains in state one 1. When any shared locks terminate 6, the method decrements the global count accordingly and remains in state one 1.

If the global count is non-zero, when a process requests an exclusive lock (e.g., an exclusive waiter is present) the method transitions 7 from state one 1 to state two 2. When an exclusive waiter is present, the method increments an exclusive_waiting count.

In state two 2, an exclusive waiter is present and the global count is non-zero. In this state, an exclusive waiter is put to sleep until an exclusive lock is granted in state four 4. If the method receives a shared lock request 8, the per-process count for that process is incremented and the method remains in state two 2. When a shared lock terminates 9, the system remains in state two 2 but accounting is determined by whether the per-process count for that process is zero. If the per-process count for that process is zero, the global count is decremented. If, however, the per-process count is non-zero, the per-process count is decremented.

In one embodiment, the per-process count is kept in a hash table. In another embodiment, the per-process count is kept in an existing structure in the kernel. In yet another embodiment, the per-process count is kept in the thread data of a thread implementation. It is recognized that a variety of data structures may be used such as, for example, linked lists, arrays, flat files, binary trees, B trees, queries, databases, and so forth.

When the global count becomes zero, the method transitions 10 from state two 2 to state three 3. In state three 3, the exclusive-waiting count is non-zero and the global count is zero. If the method receives a recursive lock request 11, the method grants the recursive lock request and increments the per-process count for that process. If the method receives a first-time lock request 12, the method denies the first-time lock request, puts the process requesting the first-time lock to sleep, and increments a first-time lock count. When any shared lock terminates 13, the method decrements the per-process count. In some embodiments, first-time and recursive lock requests are determined by the per-process count.

When all the per-process counts become zero, the method transitions 14 from state three 3 to state four 4. In state four 4, the global count is zero and all per-process counts are zero (e.g., no recursive shared locks exist on the shared resource). In this state, one exclusive lock request is granted. Upon granting the exclusive lock request, the method decrements the exclusive_waiting count. So long as the process owns an exclusive lock on the shared resource, any shared lock requests 32, first-time and recursive, are deferred and put to sleep. If, after the exclusive lock terminates, no additional exclusive waiters are present, the method transitions 16 from state 4 to state 1 and any deferred shared lock requests are granted.

In one embodiment, if another exclusive waiter is present in state four 4, the method remains in state four 4 and grants the next exclusive lock request only after the preceding exclusive lock is terminated. First-time shared locks that were deferred before the exclusive lock was granted remain asleep until all deferred exclusive locks are granted. In another embodiment, if the first-time lock count is non-zero and the exclusive waiter counter is non-zero, the system transitions from state 4 to state 2 and deferred first-time shared locks are granted while remaining deferred exclusive lock requests remain asleep.

In state one 1, if the global count is zero and the process requests an exclusive lock, the method transitions 17 from state one 1 to state four 4. By transitioning 17 directly form state one 1 to state four 4, the process requesting an exclusive lock is granted an exclusive lock immediately because it is not competing for access to the shared resource.

Figure 3:
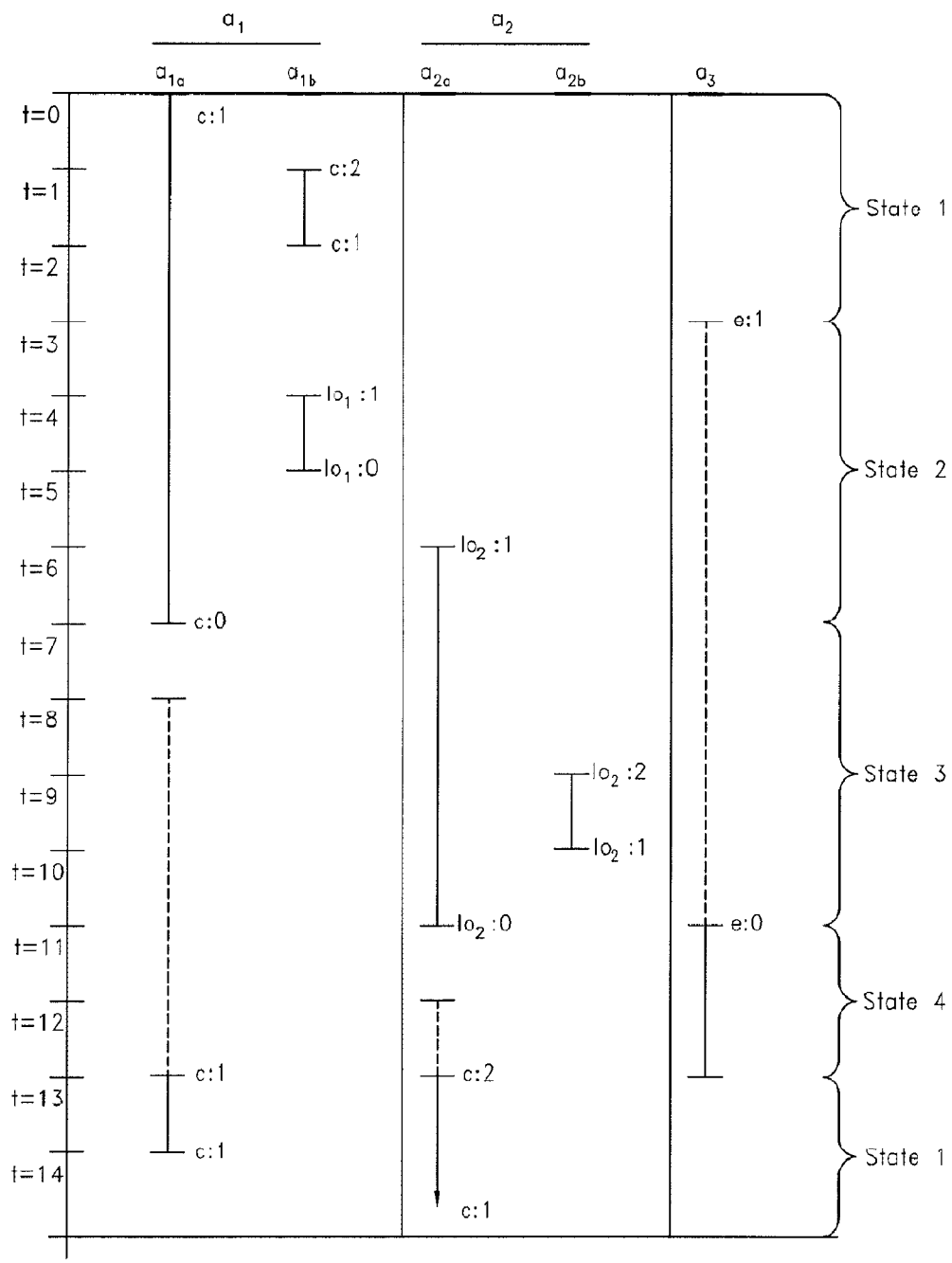
FIG. 3 illustrates how one embodiment controls access to a shared resource over time.

FIG. 3 is an illustration of how the state diagram in FIG. 2, if employed, allocates access to a shared resource. The vertical access represents time on the left and the relevant state on the right. On the horizontal axis of FIG. 3 are three processes that wish to access the shared resource: processes $a_1$, $a_2$, and $a_3$. For purposes of this illustration, processes $a_1$ and $a_2$ request only shared locks, and process $a_3$ requests only exclusive locks. Within process $a_1$ are two subprocesses, $a_{1a}$ and $a_{1b}$, and within process $a_2$ are two subprocesses, $a_{2a}$ and $a_{2b}$. Subprocesses $a_{1a}$ and $a_{2a}$ will only request first-time locks, and subprocesses $a_{1b}$ and $a_{2b}$ will only request recursive locks if its paired subprocess already owns a shared lock. Further, the solid lines indicate that a process has a lock on the shared resource, and the dashed lines indicate that the process has been put to sleep after having its lock request deferred.

At t=0, process a, requests a shared lock 5 via subprocess $a_{1a}$ and it is granted. Accordingly, the global count, c, is incremented to equal 1. The shared lock request is granted due to the method in state one 1 (e.g., no exclusive waiter is present). At t=1, $a_1$ requests a recursive lock 5 via $a_{1b}$ and it is granted. Accordingly, the global count is incremented to two. At t=2, process $a_1$ terminates its recursive 6 lock via $a_{1b}$. Consequently, the global count is decremented to equal one.

At t=3, process $a_3$ requests an exclusive lock but the process was put to sleep because process a, has a shared lock. Thus, an exclusive waiter is present and the exclusive_waiting count, e, is incremented to 1. Accordingly, the system transitions 7 to state two 2 and the exclusive_waiting count is incremented. In state two 2, all shared locks are granted 8 and accounting of shared locks transitions partially to a process-specific counter, the per-process count. When a process obtains a shared lock, the per-process count for that shared lock is incremented. If the shared lock is terminated 9 in state two 2, however, the per-process count is decremented so long as it is non-zero. If, however, the per-process count is zero, then the global count is decremented.

At t=4, process a, has its existing shared lock from t=0. Also, process $a_1$ requests a recursive lock via $a_{1b}$. The recursive lock is granted and the per-process count for $a_1$, $lo_1$, is incremented to equal 1. At t=5, process a, terminates its recursive lock 9 via $a_{1b}$. Consequently, $lo_1$ is decremented to equal zero because it was non-zero at the time that $a_1$ terminated its recursive lock via $a_{1b}$. At t=6, process $a_2$ requests a first-time 8 lock via $a_{2a}$. The per-process count for $a_2$, $lo_2$, is incremented to equal 1. At t=7, process $a_1$ terminates its shared lock 9 via $a_{1a}$. Because the per-process count for process $a_1$, $lo_1$, is already zero, the global count is decremented by 1 to equal zero.

At t=7, the method transitions 10 from state two 2 to state three 3 because an exclusive waiter is present and the global count has reached zero. In state three 3, recursive lock requests 11 are granted and non-recursive shared lock requests 12 are deferred and put to sleep. When a recursive lock request 11 is granted, the per-process count is incremented. On the other hand, when a recursive lock or an existing shared lock terminates 13, the per-process count is decremented. State three 3 persists until the per-process counts reach zero.

At t=8, process $a_2$ has a shared lock that remains from state two. Process $a_1$ requests a first-time lock 12 via $a_{1a}$ at t=8. However, the first-time lock request 13 is deferred and put to sleep. At t=9, process $a_2$ requests a recursive lock 11 via $a_{2b}$. Thus, the shared lock is granted and the per-process count, 102, is incremented by one to equal two. At t=10, process $a_2$ terminates its recursive lock 13 via $a_{2b}$ and the per-process count for $a_2$, $lo_2$, is decremented to equal one. At t=11, process $a_2$ terminates its shared lock 13 via $a_{2a}$ and $lo_2$ is decremented to equal zero.

At t=11, all per-process counts have reached zero and the global count, c, is zero indicating that no shared locks exist. Because no shared locks exist and an exclusive waiter is present, the method transitions 14 to state four 4. In state four 4, one exclusive lock request is granted and all first-time shared lock requests 32 are deferred and put to sleep. Once an exclusive waiter has been granted its exclusive lock to the shared resource, the exclusive_waiting count is decremented by one.

At t=11, process $a_3$ is granted its exclusive lock request. The exclusive_waiting count, e, is decremented to equal zero. At t=12, process $a_2$ requests a first-time lock 32 on the shared resource, but the request is deferred because process $a_3$ has an exclusive lock on the resource. Accordingly, $a_2$'s first-time lock request 32 via $a_{2a}$ is put to sleep.

At t=13, process $a_3$ terminates its exclusive lock. When the exclusive lock is terminated and no other exclusive waiters are present, the method transitions 16 to state one 1. At this point, pending shared lock requests 5, including first-time shared lock requests, are granted. Thus, pending lock requests by $a_1$ and $a_2$ are granted 5 and the global count is incremented by two. At t=14, process $a_{1a}$ terminates its shared lock 6 on the shared resource and the global count is decremented to equal 1.

III. System for Managing Concurrent Access Requests to a Shared Resource

Figure 4A:
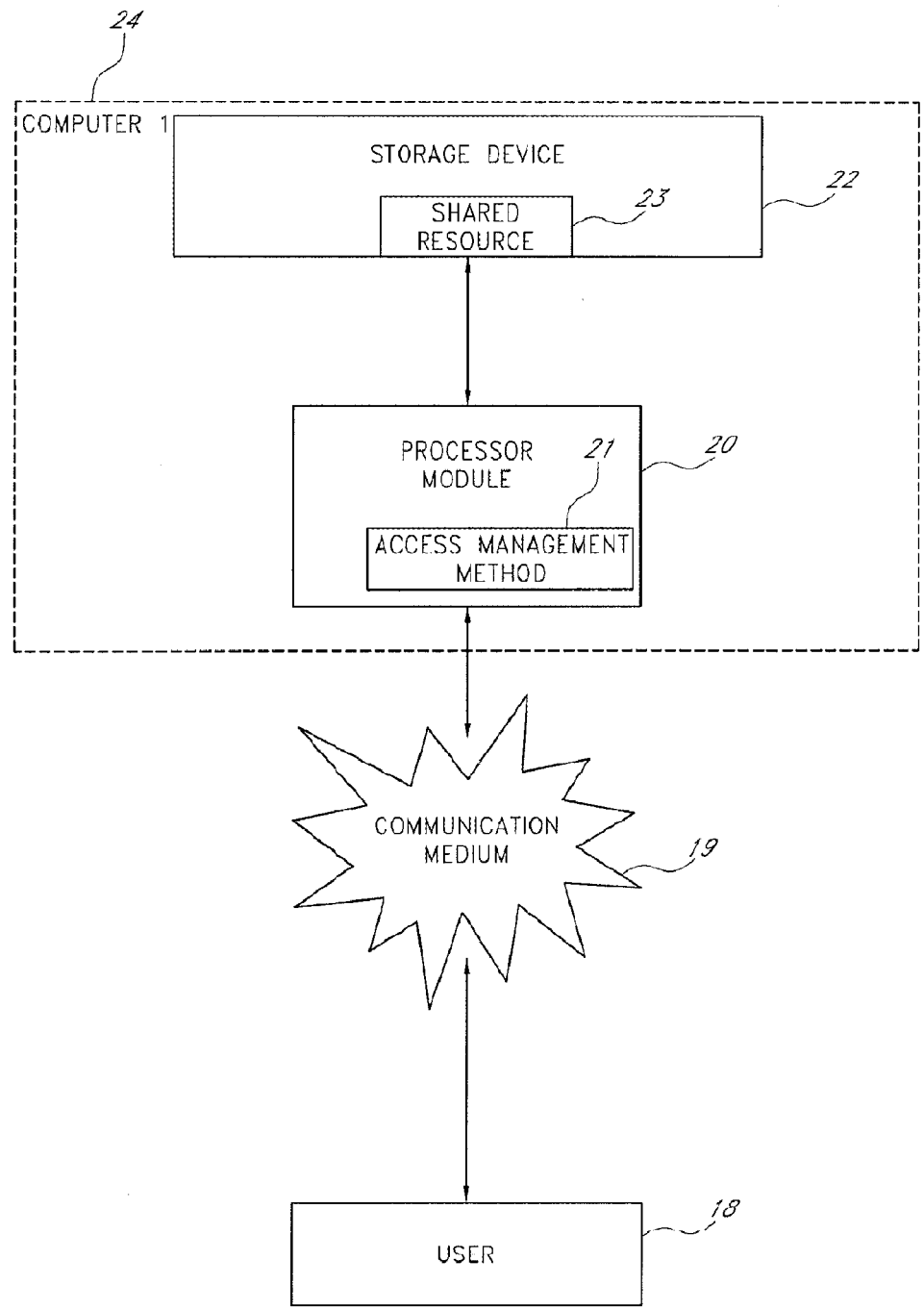
FIG. 4a illustrates a high-level block diagram of one embodiment of the present invention.

FIG. 4A illustrates one embodiment of the access management system for managing concurrent access requests to a shared resource. A user 18 is in communication with a computer 24 via a communication medium 19. The computer 24 includes a processor module 20 and a storage device 22.

In one embodiment, the processor module 20 includes an access management method 21. In another embodiment, the storage device 22 is comprised of the access management method 21. In some embodiments, the access management method 21 is hardwired to implement the state diagram of FIG. 2, the access management method 21 is a software code configured to implement the state diagram of FIG. 2, or the access management method 21 is implemented as a combination of software and firmware.

The storage device 22 includes a shared resource 23. In some embodiments, the shared resource 23 can be a shared data segment, a shared database, a shared software process, a shared software application, and so forth. In other embodiments, the shared resource may be located outside the storage device and may include a shared device (e.g., printer, CD ROM drive, RAM, mouse, keyboard, monitor, etc.). In further embodiments, the shared resource may be the storage device.

In FIG. 4A, the user 18 communicates with a computer 24 over a communication medium 19. In some embodiments, if the user 18 calls a function that is recursive, while concurrently calling another process that requires an exclusive lock on the shared resource 23, the access management method 21 implements the state diagram of FIG. 2. In other embodiments, the user 18 initiates some action that later triggers a request for access to a shared resource. In further embodiments, a request to access a shared resource is made without user action. The access management method 21 may then effectively control the concurrent shared and exclusive access requests to the shared resource.

Figure 4B:
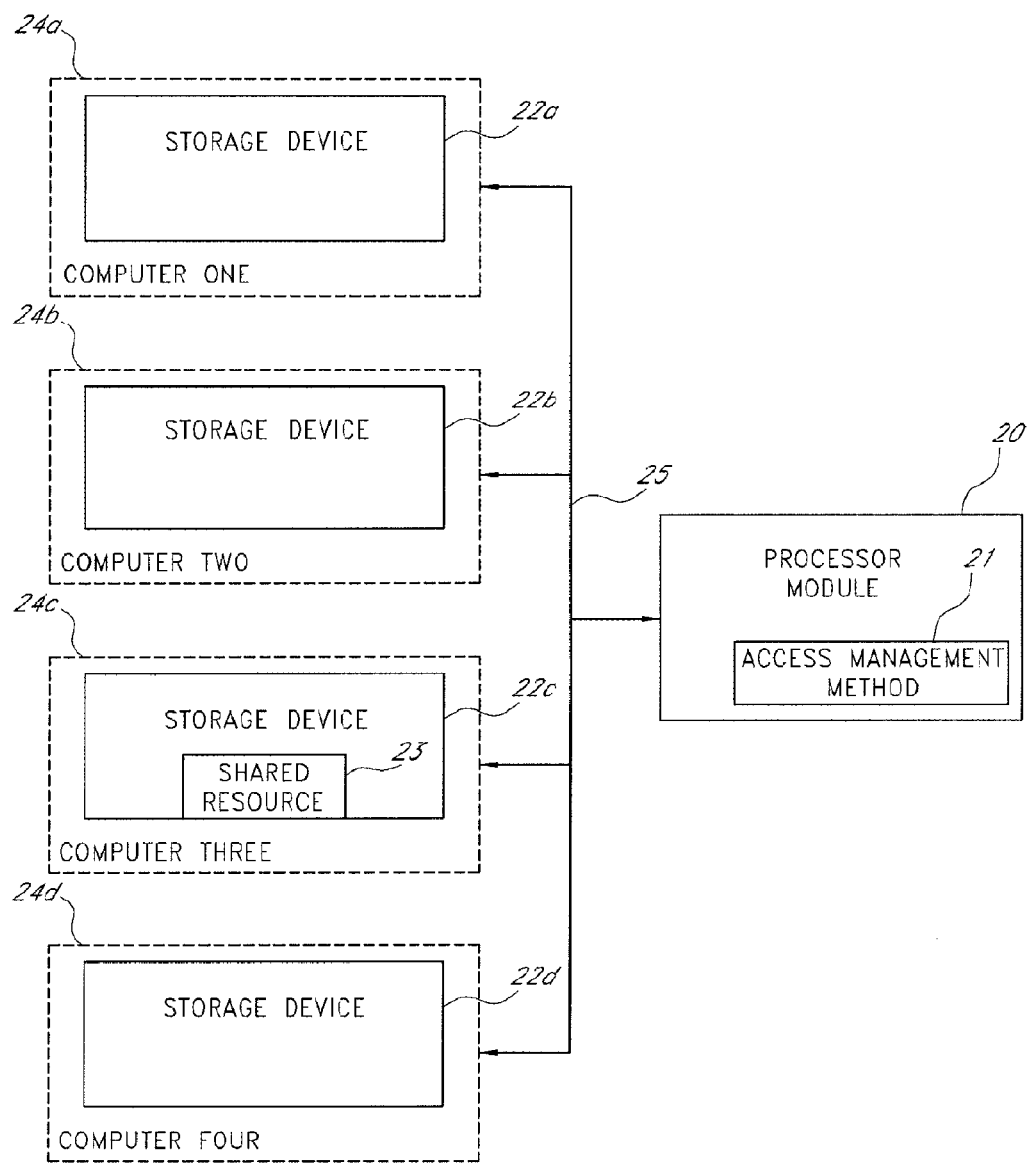
FIG. 4b illustrates a high-level block diagram of another embodiment of the present invention.

FIG. 4B illustrates another embodiment of the access management system of managing concurrent access requests to a shared resource. In FIG. 4, the processor module 20 contains an access management method 21. The processor module is in communication with computers one through four 24A-D. In each of these computers is a storage device 21A-D. In computer three 24C, the storage device 22C contains the shared resource 23. When any of the computers 24 A-D in this network attempt to access the shared resource 23, the request is first sent to the processor module 20. The request is controlled by the access management method 21 to handle concurrent access requests.

In one embodiment, the storage devices without the shared resource 22A, 22B, 22D can access the shared resource 23. In another embodiment, computer three 24C accesses the shared resource 23. In yet another embodiment, computer three 24C contains the access management method 21 and communicates directly with processes requesting concurrent access. In further embodiments, the merge lock process is located on all or a subset of the computers.

Figure 5A:
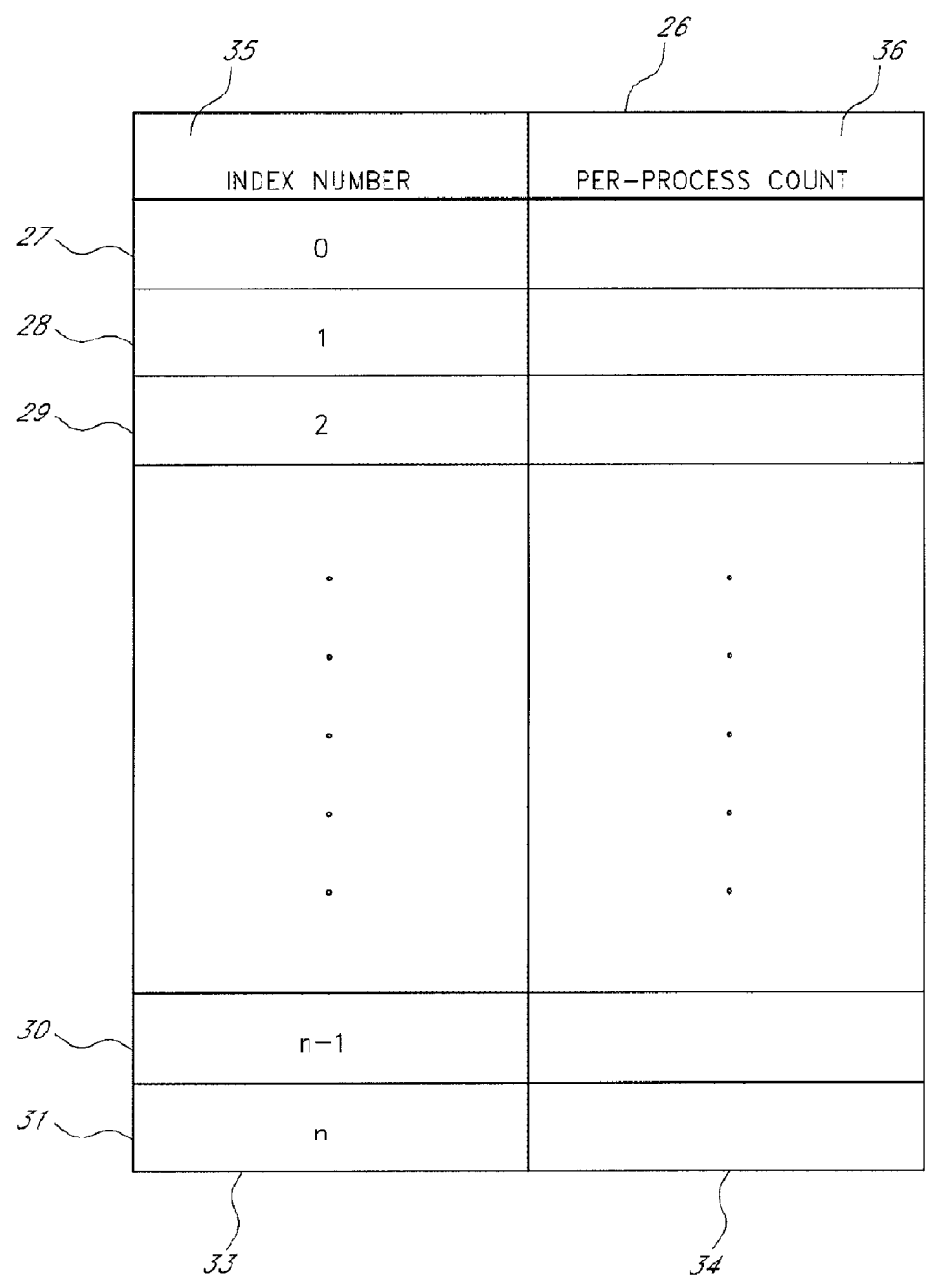

FIG. 5A illustrates a sample hash table for storing process counts. The exemplary hash table 26 includes two columns 33, 34 and a plurality of rows 27-31. Specifically, a process with a shared lock is mapped to an index number 35 and the number of shared locks held by that process is contained in the corresponding process count 36. In one embodiment, the number of rows in the hash table is statistically determined by the specific application of the system.

Figure 5B:
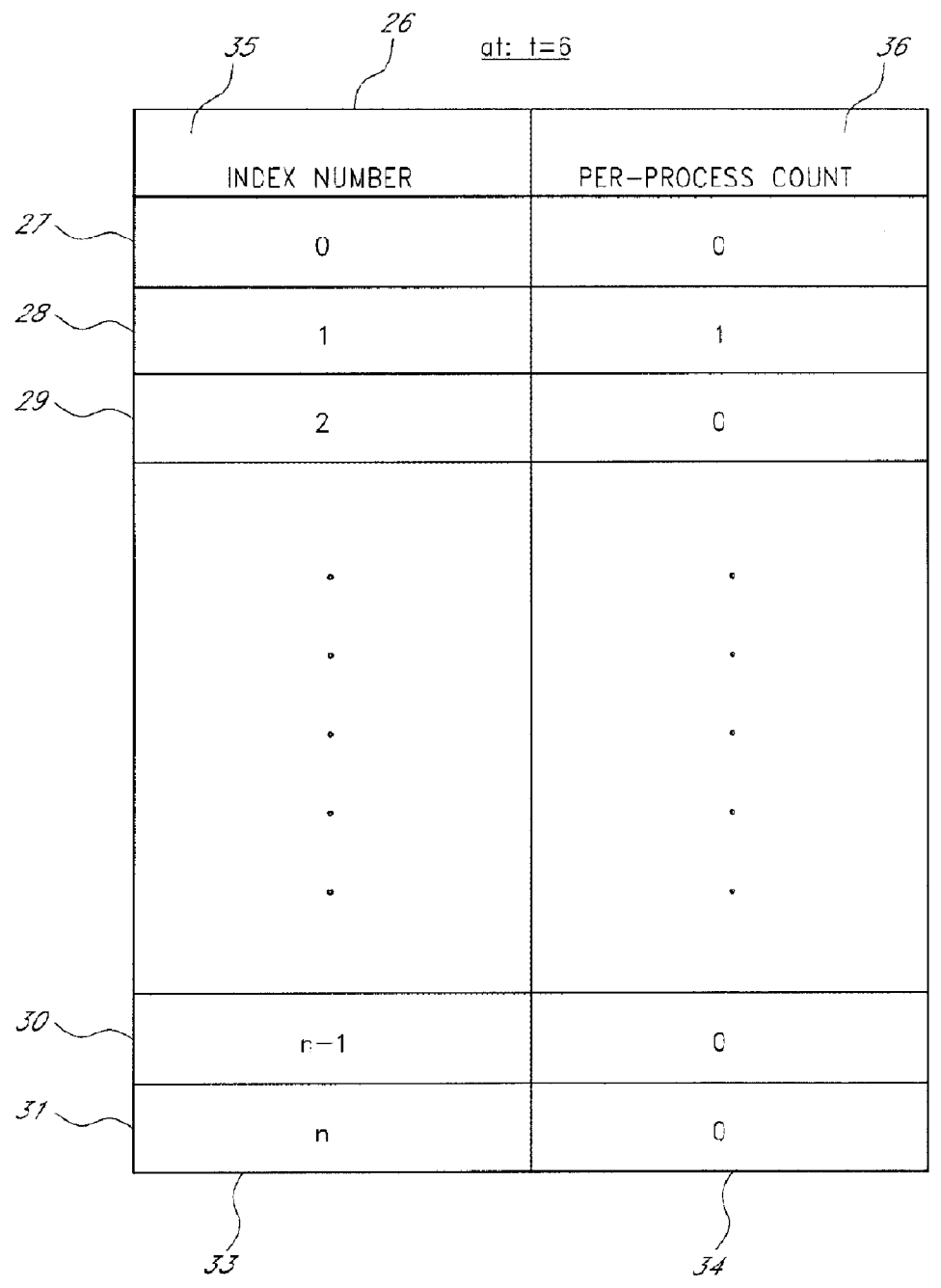

FIG. 5B illustrates a sample hash table with corresponding sample data. Using FIG. 3 for data, the hash table can map the individual process counts 36 with their respective number of shared locks. Referring to FIG. 3, the number of shared locks at t=6 is zero for process $a_1$ and one for process $a_2$. Thus, the first row 27 represents the process count 36 for $a_1$. In other words, the process count for $a_1$ is mapped to the index 35 in the first row 27 and the value zero is stored in the process count 36 of the first row 27. Similarly, the value one is stored in the second row 28, the index mapped to $a_2$.

IV. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A method of managing concurrent access requests to a data segment, comprising:
    tracking shared lock requests from a plurality of processes in a first data structure when no exclusive waiter is present, wherein the first data structure tracks the total number of shared locks;
    tracking shared lock requests in a second data structure when an exclusive waiter is present and the total number of shared locks is greater than zero, wherein the second data structure tracks the number of shared locks held by each of the plurality of processes;
    tracking recursive shared lock requests in the second data structure when an exclusive waiter is present and the total number of shared locks is zero;
    granting an exclusive lock to the exclusive waiter when the total number of shared locks is zero and the number of shared locks held by each of the plurality of processes is zero.

2. A method of managing concurrent access requests to a shared resource, comprising:
    receiving a first plurality of shared requests;
    granting the first plurality of shared requests;
    tracking completion of the first plurality of shared requests;
    receiving an exclusive request;
    receiving a second plurality of shared requests before the first plurality of shared requests has been completed;
    granting the second plurality of shared requests;
    tracking completion of the second plurality of shared requests on a per-process basis;
    receiving a third plurality of shared requests after the first plurality of shared requests has been completed;
    determining whether each of the third plurality of shared requests is a recursive request;
    for each of the recursive requests,
        granting the recursive request; and
        tracking completion of the recursive request on a per-process basis; and
    after completion of the third plurality of shared requests and the recursive requests, granting the exclusive request.

3. A method of managing concurrent access requests to a shared resource, wherein a first at least one process has a shared lock on the shared resource, comprising:
    storing a representation of the number of a second at least one processes waiting to obtain an exclusive lock on the shared resource in an exclusive waiting count, wherein the exclusive waiting count is a first data structure and the second at least one processes waiting to obtain an exclusive lock on the shared resource are put to sleep;
    storing a representation of the number of first at least one processes that have a shared lock on the shared resource in a global count if the exclusive waiting count indicates that none of the second at least one processes are waiting to obtain an exclusive lock on the shared resource, wherein the global count is a second data structure;
    adjusting a per-process count when one of the first at least one processes obtains a shared lock on the shared resource if the exclusive waiting count indicates that at least one of the second at least one processes is waiting to obtain an exclusive lock on the shared resource, wherein the per-process count is a third data structure that stores a representation of the number of shared locks held by each of the first at least one processes;
    adjusting the per-process count when one of the first at least one processes terminates a shared lock on the shared resource if the exclusive waiting count indicates that at least one of the second at least one processes is waiting to obtain an exclusive lock on the shared resource and the global count indicates that at least one of the first at least one processes holds a shared lock on the shared resource and the per-process count indicates that the one of the first at least one processes does not hold a shared lock on the shared resource;
    adjusting the global count when at least one of the first at least one processes terminates a shared lock on the shared resource if the exclusive waiting count indicates that at least one of the second at least one processes is waiting to obtain an exclusive lock on the shared resource and the global count indicates that at least one of the first at least one processes holds a shared lock on the shared resource and the per-process count indicates that none of the first at least one processes holds a shared lock on the shared resource; and granting all shared lock requests from the first at least one processes if the global count indicates that at least one of the first at least one processes holds a shared lock on the shared resource.

4. The method of managing concurrent access requests to a shared resource of claim 3, wherein the global count indicates that none of the first at least one processes holds a shared lock on the shared resource and the per-process count indicates that at least one of the first at least one processes holds a shared lock on the shared resource and the exclusive waiting count indicates that at least one of the second at least one second processes is waiting to obtain an exclusive lock on the shared resource, further comprising:

putting to sleep all requests for a first-time lock by the first at least one processes;

granting all requests for a recursive lock by the first at least one processes;

adjusting the per-process count when at least one of the first at least one processes requests a recursive lock on the shared resource; and adjusting the per-process count when at least one of the first at least one processes terminates a shared lock on the shared resource.

5. The method of managing concurrent access requests to a shared resource of claim 4, wherein the global count indicates that none of the first at least one processes holds a shared lock on the shared resource and the per-process count indicates that none of the first at least one processes holds a shared lock on the shared resource and the exclusive waiting count indicates that at least one of the second at least one second processes is waiting to obtain an exclusive lock on the shared resource, further comprising:

putting to sleep all requests for a shared lock by the first at least one processes;

granting an exclusive lock to one of the second at least one processes waiting to obtain an exclusive lock on the shared resource; and adjusting the exclusive waiting count.

6. The method of managing concurrent access requests to a shared resource of claim 3, wherein the third data structure is a hash table.

7. The method of managing concurrent access requests to a shared resource of claim 5, wherein the global count indicates that none of the first at least one processes holds a shared lock on the shared resource and the per-process count indicates that none of the first-at least one processes holds a shared lock on the shared resource and the exclusive waiting count indicates that at least one of the second at least one second processes is waiting to obtain an exclusive lock on the shared resource, further comprising:

granting an exclusive lock to each of the second at least one processes waiting to obtain an exclusive lock in turn until the exclusive waiting count indicates that none of the second at least one process is waiting to obtain an exclusive lock.

8. The method of managing concurrent access requests to a shared resource of claim 5, wherein the global count indicates that none of the first at least one processes holds a shared lock on the shared resource and the per-process count indicates that none of the first-at least one processes holds a shared lock on the shared resource and the exclusive waiting count indicates that none of the second at least one second processes is waiting to obtain an exclusive lock on the shared resource, further comprising:

granting a shared lock to at least one of the first at least one processes that are sleeping.

9. An access management system for managing concurrent access requests to a shared resource comprising:

a shared resource;

a processor module, wherein a first at least one process has a shared lock on the shared resource, configured to:

receive requests from the first at least one processes for a shared lock on the shared resource;

receive requests from a second at least one process for an exclusive lock on the shared resource;

store a representation of the number of a second at least one processes waiting to obtain an exclusive lock on the shared resource in an exclusive waiting count, wherein the exclusive waiting count is a first data structure and the second at least one processes waiting to obtain an exclusive lock on the shared resource are put to sleep;

store a representation of the number of the first at least one processes that have a shared lock on the shared resource in a global count if the exclusive waiting count indicates that none of the second at least one processes are waiting to obtain an exclusive lock on the share resource, wherein the global count is a second data structure;

adjust a per-process count when one of the first at least one processes obtains a shared lock on the shared resource if the exclusive waiting count indicates that at least one of the second at least on processes is waiting to obtain an exclusive lock on the shared resource, wherein the per-process count is a third data structure that stores a representation of the number of shared locks held by each of the first at least one processes;

adjust the per-process count when one of the first at least one processes terminates a shared lock on the shared resource if the exclusive waiting count indicates that at least one of the second at least one processes is waiting to obtain an exclusive lock on the shared resource and the global count indicates that at least one of the first at least one processes holds a shared lock on the shared resource and the per-process count indicates that one of the first at least one processes holds a shared lock on the shared resource;

adjust the global count when one of the first at least one processes terminates a shared lock on the shared resource if the exclusive waiting count indicates that at least one of the second at least one processes is waiting to obtain an exclusive lock on the shared resource and the global count indicates that at least one of the first at least processes holds a shared lock on the shared resource and the per-process count indicates that the one of the first at least one processes does not hold a shared lock on the shared resource; and grant all shared lock requests from the first at least one processes if the global count indicates that at least one of the first at least one processes holds a shared lock on the shared resource.

10. The access management system of claim 9, further comprising:

the processor module, wherein the writers waiting counter indicates that none of the first at least one processes holds a shared lock on the shared resource and the per-process count indicates that at least one of the first at least one processes holds a shared lock on the shared resource and the exclusive waiting count indicates that at least one of the second at least one second processes is waiting to obtain an exclusive lock on the shared resource, further configured to:
put to sleep all requests for a first-time lock by the first at least one processes;
grant all requests for a recursive lock by the first at least one processes;
adjust the per-process count when at least one of the first at least one processes requests a recursive lock on the shared resource; and
adjust the per-process count when at least one of the first at least one processes terminates a shared lock on the shared resource.

11. The access management system of claim 10, further comprising:
the processor module, wherein the global count indicates that none of the first at least one processes holds a shared lock on the shared resource and the per-process count indicates that none of the first at least one processes holds a shared lock on the shared resource and the exclusive waiting count indicates that at least one of the second at least one second processes is waiting to obtain an exclusive lock on the shared resource, further configured to:
put to sleep all requests for a shared lock by the first at least one processes;
grant an exclusive lock to one of the second at least one processes waiting to obtain an exclusive lock on the shared resource; and
adjust the exclusive waiting count.

12. The access management system of claim 9, wherein the third data structure is a hash table.

13. The access management system of claim 11, further comprising:
the process module, wherein the global count indicates that none of the first at least one processes holds a shared lock on the shared resource and the per-process count indicates that none of the first-at least one processes holds a shared lock on the shared resource and the exclusive waiting count indicates that at least one of the second at least one second processes is waiting to obtain an exclusive lock on the shared resource, further configured to:
grant an exclusive lock to each of the second at least one processes waiting to obtain an exclusive lock in turn until the exclusive waiting count indicates that none of the second at least one process is waiting to obtain an exclusive lock.

14. The access management system of claim 11, further comprising:
the processor module, wherein the global count indicates that none of the first at least one processes holds a shared lock on the shared resource and the per-process count indicates that none of the first-at least one processes holds a shared lock on the shared resource and the exclusive waiting count indicates that none of the second at least one second processes is waiting to obtain an exclusive lock on the shared resource, further configured to:
grant a shared lock to at least one of the first at least one processes that are sleeping.

15. The access management system of claim 9, wherein the first and second at least one processes are received from a plurality of sources.

16. The access management system of claim 9, further comprising:
the shared resource, wherein the shared resource is located on a standalone computer; and
the processor module, wherein the processor module is located on the standalone computer.

17. The access management system of claim 9, wherein the shared resource is remotely located from the processor module.

* * * * *

UNITED STATES PATENT AND TRADEMARK OFFICE
CERTIFICATE OF CORRECTION

PATENT NO. : 7,346,720 B2  Page 1 of 2
APPLICATION NO. : 11/255346
DATED : March 18, 2008
INVENTOR(S) : Neal T. Fachan It is certified that error appears in the above-identified patent and that said Letters Patent is hereby corrected as shown below:

In the Drawings Sheet 3 of 8 (Reference Numeral 2) (FIG. 2), Line 5, delete "ron-zero" and insert -- non-zero --, therefor.

In the Drawings Sheet 3 of 8 (Reference Numeral 4) (FIG. 2), Line 1, delete "Fcu-" and insert -- Four --, therefor.

In the Drawings Sheet 3 of 8 (Above Reference Numeral 31) (FIG. 2), Line 4, delete "recues-" and insert -- request --, therefor.

In Column 3, Line 58, after "request" insert -- . --.

In Column 4, Line 4, after "the" delete ",".

In Column 4, Line 55, delete "share" and insert -- shared --, therefor.

In Column 7, Line 1, before "has" delete "a," and insert -- $a_1$ --, therefor.

In Column 7, Line 5 (Approx.), delete "a," and insert -- $a_1$ --, therefor.

In Column 7, Line 7 (Approx.), after "with" delete "a," and insert -- $a_1$ --, therefor.

In Column 7, Line 8 (Approx.), after "$a_1$" delete ",".

In Column 7, Line 45 (Approx.), delete "a," and insert -- $a_1$ --, therefor.

In Column 9, Line 28, after "t=3" insert -- . --.

In Column 10, Line 34 (Approx.), delete "exclusive-waiting" and insert -- exclusive_waiting --, therefor.

In Column 10, Line 64, delete "exclusive waiter" and insert -- exclusive_waiter --, therefor.

In Column 11, Line 23, after "process" delete "a," and insert -- $a_1$ --, therefor.

In Column 11, Line 32, before "has" delete "a," and insert -- $a_1$ --, therefor.

UNITED STATES PATENT AND TRADEMARK OFFICE
CERTIFICATE OF CORRECTION

PATENT NO. : 7,346,720 B2
APPLICATION NO. : 11/255346
DATED : March 18, 2008
INVENTOR(S) : Neal T. Fachan It is certified that error appears in the above-identified patent and that said Letters Patent is hereby corrected as shown below:

In Column 11, Line 44, after "process" delete "a," and insert -- $a_1$ --, therefor.

In Column 11, Line 47, after "process" delete "a," and insert -- $a_1$ --, therefor.

In Column 16, Line 26, in Claim 9, delete "share" and insert -- shared --, therefor.

Signed and Sealed this

Twenty-fourth Day of March, 2009

JOHN DOLL
*Acting Director of the United States Patent and Trademark Office*